US012773877B2

(12) United States Patent
Ikeuchi et al.

(10) Patent No.: US 12,773,877 B2
(45) Date of Patent: Oct. 27, 2026

(54) RESIN COMPOSITION FOR TIRES AND PNEUMATIC TIRE

(71) Applicant: Toyo Tire Corporation, Itami (JP)

(72) Inventors: Yuuki Ikeuchi, Itami (JP); Norio Minouchi, Itami (JP)

(73) Assignee: Toyo Tire Corporation, Itami (JP)

( * ) Notice: Subject to any disclaimer, the term of this patent is extended or adjusted under 35 U.S.C. 154(b) by 516 days.

(21) Appl. No.: 18/376,060

(22) Filed: Oct. 3, 2023

(65) Prior Publication Data

US 2024/0140139 A1 May 2, 2024

(30) Foreign Application Priority Data

Oct. 28, 2022 (JP) ................................ 2022-172855

(51) Int. Cl.
*B60C 1/00* (2006.01)
*C08L 21/00* (2006.01)
*C08L 91/00* (2006.01)

(52) U.S. Cl.
CPC ................ *B60C 1/00* (2013.01); *C08L 21/00* (2013.01); *C08L 91/00* (2013.01)

(58) Field of Classification Search
CPC ...................................................... C08L 21/00
See application file for complete search history.

(56) References Cited

U.S. PATENT DOCUMENTS

2003/0100643 A1 5/2003 Kikuchi
2004/0127617 A1 7/2004 Vasseur et al.
2004/0211111 A1* 10/2004 Kikuchi ................ C08K 5/103 44/300
2005/0148713 A1 7/2005 Labauze et al.
2019/0085156 A1* 3/2019 Sakurai .................... C08K 3/06

FOREIGN PATENT DOCUMENTS

| | | | |
|---|---|---|---|
| EP | 1 329 478 | A1 | 7/2003 |
| EP | 3 225 657 | A1 | 10/2017 |
| JP | 2003-64222 | A | 3/2003 |
| JP | 2004-519551 | A | 7/2004 |
| JP | 2005-537369 | A | 12/2005 |
| JP | 2007-510025 | A | 4/2007 |
| JP | 2009-234077 | A | 10/2009 |
| JP | 2012-131860 | A | 7/2012 |
| WO | 2005/049724 | A1 | 6/2005 |

OTHER PUBLICATIONS

Ampairojanawong, R.; Boripun, A.; Ruankon, S.; Suwanasri, T.; Cheenkachorn, K.; Kangsadan, T. Electrochem 2023, 4, 123. (Year: 2023).*

Extended European Search Report dated Feb. 23, 2024, issued in counterpart EP application No. 23198166.3. (7 pages).

* cited by examiner

*Primary Examiner* — Michael F Pepitone
(74) *Attorney, Agent, or Firm* — WHDA, LLP

(57) ABSTRACT

A rubber composition for tires, comprising a rubber component and a vegetable oil wherein the vegetable oil contains palmitic acid and oleic acid in a mass ratio ((palmitic acid)/(oleic acid)) of 0.65 or more and 1.2 or less. It is preferred that the vegetable oil is palm oil. It is more preferred that the vegetable oil has an iodine value of 50 or more and 75 or less. It is more preferred that the vegetable oil has an oleic acid content of 40% by mass or more and 53% by mass or less.

5 Claims, No Drawings

RESIN COMPOSITION FOR TIRES AND PNEUMATIC TIRE

BACKGROUND OF THE INVENTION

Field of the Invention

The present invention relates to a rubber composition for tires and a pneumatic tire.

Description of the Related Art

As a response to global environmental problems, it is desirable that sustainable raw materials are used also for a rubber composition for tires. As for an oil component used as a raw material of a rubber composition for tires, replacement of petroleum-derived oil conventionally used by plant-derived oil has been studied.

Patent Document 1 mentioned below discloses a rubber composition for side walls or base treads, including a rubber component containing at least two diene-based rubbers and a glycerol fatty acid triester derived from a non-petroleum resource, wherein the rubber component contains at least one diene-based rubber selected from the group consisting of natural rubber, epoxidized natural rubber, and butadiene rubber, and the glycerol fatty acid triester has an oleic acid content of 45% by mass or more.

Patent Document 2 mentioned below discloses a rubber composition containing 5 to 150 parts by weight of an inorganic filler, 0 to 30 parts by weight of a silane coupling agent, and 5 to 100 parts by weight of a vegetable oil having an iodine value of 130 or less per 100 parts by weight of a diene-based rubber.

Patent Document 3 mentioned below discloses a tire tread including at least a rubber composition, wherein the composition contains at least a diene elastomer, a reinforcing inorganic filler, a coupling agent, and a plasticizing agent, the diene elastomer contains more than 30 phr of butyl rubber, and the plasticizing agent contains an unsaturated (C12-C22) fatty acid triester of glycerol.

Patent Document 4 mentioned below discloses a cross-linked rubber composition usable for producing tires suitable for driving on icy snow-covered roads and snow surfaces and having improved abrasion resistance and gripping performance on wet roads, particularly tire treads for automobiles, the rubber composition having a Shore A hardness of 45 or more and 57 or less as measured in accordance with Standard ASTM D2240 of 1997 and including (phr=parts by weight per 100 parts by weight of elastomer(s)): (1) greater than 25 phr and up to 100 phr of one or more diene elastomers each having a glass transition temperature Tg between −75° C. and −40° C.; (2) less than 75 phr and down to 0 phr of one or more diene elastomers each having a glass transition temperature Tg between 110° C. and −75° C.; (3) from 5 to 35 phr of at least one hydrocarbon plasticizing resin miscible in the diene elastomer(s), the resin having a glass transition temperature Tg between 10° C. and 150° C. and a number-average molecular weight between 400 g/mol and 2000 g/mol; and (4) from 5 to 35 phr of at least one synthetic or natural plasticizing compound containing at least one glycerol fatty acid triester, wherein an aggregate constituted by the fatty acid(s) contains oleic acid in a mass fraction equal to or greater than 60%.

Patent Document 5 mentioned below discloses a cross-linkable or cross-linked rubber composition usable for constituting a tire tread, the composition being based on at least one or more diene elastomers and a plasticizer containing a glycerol oleic acid triester, wherein the plasticizer contains one or more synthetic and/or natural compounds not extracted from petroleum present in a mass fraction of 45% to 100%, the compounds containing at least one glycerol fatty acid triester, wherein, as a whole, the fatty acids in the triester contain oleic acid in a mass fraction equal to or greater than 60%, and one or more plasticizing oils extracted from paraffinic, aromatic, or naphthenic petroleum in a mass fraction of 55% to 0%.

PRIOR ART DOCUMENTS

Patent Documents

Patent Document 1: JP-A-2012-131860
Patent Document 2: JP-A-2003-64222
Patent Document 3: JP-A-2007-510025
Patent Document 4: JP-A-2005-537369
Patent Document 5: JP-A-2004-519551

SUMMARY OF THE INVENTION

In the case of the techniques described in Patent Documents 1 to 5 mentioned above, the tensile strength of rubber particularly tends to reduce. Therefore, there is a room for improvement when vegetable oil is used particularly for tires.

In view of the above circumstances, it is an object of the present invention to provide a rubber composition for tires as a raw material of a vulcanized rubber for tires excellent in tensile strength and a pneumatic tire containing a vulcanized rubber of the rubber composition.

The above object can be achieved by the following configurations. Specifically, the present invention relates to a rubber composition for tires (1) containing a rubber component and a vegetable oil, wherein the vegetable oil contains palmitic acid and oleic acid in a mass ratio ((palmitic acid)/(oleic acid)) of 0.65 or more and 1.2 or less.

The rubber composition for tires (1) is preferably a rubber composition for tires (2), wherein the vegetable oil is palm oil.

The rubber composition for tires (1) or (2) is preferably a rubber composition for tires (3), wherein the vegetable oil has an iodine value of 50 or more and 75 or less.

Any one of the rubber compositions for tires (1) to (3) is preferably a rubber composition for tires (4), wherein the vegetable oil has an oleic acid content of 40% by mass or more and 53% by mass or less.

The present invention also relates to a pneumatic tire having a rubber member obtained by vulcanization molding of any one of the rubber compositions for tires (1) to (4).

When a petroleum-derived oil added to a rubber composition is replaced by a plant-derived oil, the physical properties, particularly tensile strength of a resulting vulcanized rubber generally tends to reduce. The present inventors have particularly intensively studied to improve the tensile strength of a vulcanized rubber, and as a result have focused on the mass ratio of palmitic acid to oleic acid ((palmitic acid)/(oleic acid)) that can be adjusted in the process of refinement of a vegetable oil and have examined the optimum range of the ratio. As a result, the present inventors have found that when a vegetable oil containing palmitic acid and oleic acid in a mass ratio ((palmitic acid)/(oleic acid)) of 0.65 or more and 1.2 or less is added to a rubber composition for tires, a vulcanized rubber for tires excellent in tensile strength can be produced. The reason why such an effect can be obtained is not clear, but it is expected that when a vegetable oil containing palmitic acid and oleic acid in a mass ratio ((palmitic acid)/(oleic acid)) of 0.65 or more and 1.2 or less is added to a rubber composition for tires, the dispersibility of a reinforcing filler is significantly improved, which as a result improves the tensile strength of a vulcanized rubber for tires.

A vulcanized rubber of the rubber composition for tires according to the present invention is excellent not only in tensile strength but also in scorch resistance and abrasion resistance depending on other materials to be added, such as a rubber component. Therefore, a vulcanized rubber of the rubber composition for tires according to the present invention is particularly useful for treads of pneumatic tires, particularly for base treads and side walls.

DETAILED DESCRIPTION OF THE PREFERRED EMBODIMENTS

A vulcanized rubber of a rubber composition for tires according to the present invention contains a vegetable oil containing palmitic acid and oleic acid in a mass ratio ((palmitic acid)/(oleic acid)) of 0.65 or more and 1.2 or less. In the present invention, any vegetable oil can be used as long as the mass ratio is satisfied. However, palm oil is particularly preferred because the mass ratio of palmitic acid to oleic acid can easily be adjusted by melting-point fractionation in the process of refinement and a resulting vulcanized rubber for tires is excellent in tensile strength.

The mass ratio of palmitic acid to oleic acid ((palmitic acid)/(oleic acid)) in the vegetable oil, particularly palm oil used in the present invention is adjusted to 0.65 or more and 1.2 or less. If the mass ratio is less than 0.65 or exceeds 1.2, a resulting vulcanized rubber for tires tends to deteriorate in tensile strength.

The vegetable oil, particularly palm oil used in the present invention preferably has an iodine value of 50 or more and 75 or less. Double bonds contained in the vegetable oil are electron-rich reaction sites, and the iodine value of the vegetable oil is linked to the amount of double bonds. If the iodine value of the vegetable oil is as high as more than 75, the rubber composition for tires containing such a vegetable oil has a short scorch time so that scorch resistance tends to deteriorate. On the other hand, if the iodine value is as low as less than 50, softening of a resulting vulcanized rubber for tires is insufficient, and the performance of the vegetable oil as a plasticizer deteriorates so that the processability of the rubber composition for tires tends to deteriorate.

The vegetable oil, particularly palm oil used in the present invention preferably has an oleic acid content of 40% by mass or more and 53% by mass or less. If the oleic acid content is as high as more than 53% by mass, the ratio of saturated fatty acids in the vegetable oil reduces, and the crosslinking density of a resulting vulcanized rubber for tires reduces because the unsaturated moiety thereof is highly reactive so that rubber strength tend to reduce. On the other hand, if the oleic acid content is as low as less than 40% by mass, the crosslinking density of a resulting vulcanized rubber for tires reduces after all so that abrasion resistance tends to significantly reduce.

The content of the vegetable oil, particularly palm oil used in the present invention is preferably 1 to 50 parts by mass, more preferably 2 to 40 parts by mass per 100 parts by mass of the total amount of a rubber component.

The rubber composition for tires according to the present invention contains a rubber component. As the rubber component, for example, a diene-based rubber is preferred. Examples of the diene-based rubber include, but are not limited to, natural rubber (NR), isoprene rubber (IR), butadiene rubber (BR), styrene-butadiene rubber (SBR), acrylonitrile-butadiene rubber (NBR), chloroprene rubber (CR), styrene-isoprene copolymer rubber, a butadiene-isoprene copolymer, and styrene-isoprene-butadiene copolymer rubber. These butadiene-based rubbers may be used singly or in combination of two or more of them.

The rubber composition for tires according to the present invention may contain carbon black and/or silica as a reinforcing filler, a vulcanizing agent, a vulcanization accelerator, an antiaging agent, stearic acid, a softener such as wax or oil, a processing aid, and others.

As the reinforcing filler, carbon black and/or silica are/is preferably used. That is, the reinforcing filler may be carbon black alone, silica alone, or a combination of carbon black and silica. The content of the reinforcing filler is not limited and is, for example, preferably 10 to 100 parts by mass, more preferably 20 to 90 parts by mass per 100 parts by mass of the total amount of a rubber component.

Examples of the carbon black that can be used include: carbon blacks usually used in the rubber industry, such as SAF, ISAF, HAF, FEF, and GPF; and conductive carbon blacks such as acetylene black and ketjen black. Examples of the silica to be used include silicas usually used for rubber reinforcement, such as wet silica, dry silica, sol-gel silica, and surface-treated silica. Among them, wet silica is preferred.

When silica is contained as a filler, a silane coupling agent is also preferably contained. The silane coupling agent is not limited as long as sulfur is contained in the molecule thereof, and various silane coupling agents to be added to rubber compositions together with silica may be used. Examples of such silane coupling agents include: sulfidesilanes such as bis(3-triethoxysilylpropyl)tetrasulfide (e.g., "Si69" manufactured by Degussa), bis(3-triethoxysilylpropyl)disulfide (e.g., "Si75" manufactured by Degussa), bis(2-triethoxysilylethyl)tetrasulfide, bis(4-triethoxysilylbutyl)disulfide, bis (3-trimethoxysilylpropyl)tetrasulfide, and bis(2-trimethoxysilylethyl)disulfide; mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane; and protected mercaptosilanes such as 3-octanoylthio-1-propyltriethoxysilane and 3-propionylthiopropyltrimethoxysilane.

As the vulcanizing agent, sulfur can suitably be used. The sulfur may be ordinary sulfur for rubber, and sulfur such as powdered sulfur, precipitated sulfur, insoluble sulfur, and highly dispersible sulfur can be used. The content of the vulcanizing agent in the rubber composition for tires according to the present invention is preferably 0.5 to 3.5 parts by mass per 100 parts by mass of the total amount of a rubber component.

Examples of the vulcanization accelerator include vulcanization accelerators usually used for rubber vulcanization, such as a sulfenamide-based vulcanization accelerator, a thiuram-based vulcanization accelerator, a thiazole-based vulcanization accelerator, a thiourea-based vulcanization accelerator, a guanidine-based vulcanization accelerator, and a dithiocarbamic acid salt-based vulcanization accelerator, and these may be used singly or in an appropriate combination of two or more of them.

Examples of the antiaging agent include antiaging agents usually used for rubber, such as an aromatic amine-based antiaging agent, an amine-ketone-based antiaging agent, a monophenol-based antiaging agent, a bisphenol-based antiaging agent, a polyphenol-based antiaging agent, a dithiocarbamic acid salt-based antiaging agent, and a thiourea-based antiaging agent, and these may be used singly or in an appropriate combination of two or more of them.

The rubber composition for tires according to the present invention is obtained by kneading not only the rubber component and the vegetable oil but also the reinforcing filler, the vulcanizing agent, the vulcanization accelerator, zinc oxide, the antiaging agent, stearic acid, the softener such as wax, the processing aid, and others using a kneading machine usually used in the rubber industry, such as a Banbury mixer, a kneader, or a roll.

A method for blending the above components is not limited, and any one of the following methods may be used: a method in which components to be blended other than vulcanization-type compounding agents such as a vulcanizing agent and a vulcanization accelerator are previously kneaded to prepare a master batch, the remaining components are added to the master batch, and the resultant is further kneaded, a method in which components are added in any order and kneaded, and a method in which all the components are added at the same time and kneaded.

A vulcanized rubber of the rubber composition for tires according to the present invention is excellent not only in tensile strength but also in scorch resistance and abrasion resistance depending on the rubber component. Therefore, a vulcanized rubber of the rubber composition for tires according to the present invention is particularly useful for treads, particularly for base treads and side walls.

EXAMPLES

The present invention will more specifically be described below with reference to examples.

(Preparation of Rubber Compositions for Tires)

A rubber composition of each of Examples 1 to 12 and Comparative Examples 1 to 6 was prepared by blending compounding agents with 100 parts by mass of a rubber component in accordance with the formulation shown in Tables 1 to 4 and kneading the resultant using an ordinary Banbury mixer. The compounding agents shown in Tables 1 to 4 are as follows.

(Rubber Component)

- SBR1 (ESBR (emulsion-polymerized SBR)): trade name "SBR1502" (manufactured by ENEOS Materials Corporation)
- SBR2 (SSBR (solution-polymerized SBR)): trade name "HPR350" (manufactured by ENEOS Materials Corporation)
- BR1: trade name "BR150B" (manufactured by UBE Elastomer Co., Ltd.)
- NR: trade name "RSS #3"

(Reinforcing Filler)

- Carbon black 1 (CB1) (HAF): trade name "N339 Seast KH" (manufactured by TOKAI CARBON CO., LTD.)
- Carbon black 2 (CB2) (HAF): trade name "Seast 3" (manufactured by TOKAI CARBON CO., LTD.)
- Carbon black 3 (CB3) (FEF): trade name "N550 Seast SO" (manufactured by TOKAI CARBON CO., LTD.)
- Silica: trade name "Nipsil AQ" (manufactured by TOSOH SILICA CORPORATION)

(Vegetable Oil)

- Vegetable oil 1 (Soybean refined oil): [iodine value 128, amount of oleic acid 23, mass ratio of palmitic acid to oleic acid ((palmitic acid)/(oleic acid))=0.43](manufactured by The Nisshin Oillio Group, Ltd.)
- Vegetable oil 2 (Palm oil): trade name "PL65" [iodine value 65, amount of oleic acid 48, mass ratio of palmitic acid to oleic acid ((palmitic acid)/(oleic acid)) =0.73] (manufactured by The Nisshin Oillio Group, Ltd.)
- Vegetable oil 3 (Palm oil): A product obtained by adjusting the mass ratio between palmitic acid and oleic acid of a raw material (trade name "Refined palm oil (S)", manufactured by The Nisshin Oillio Group, Ltd.) by melting-point fractionation [iodine value 53, amount of oleic acid 40, mass ratio of palmitic acid to oleic acid ((palmitic acid)/oleic acid))=1.10]
- Vegetable oil 4 (Palm oil): A product obtained by adjusting the mass ratio between palmitic acid and oleic acid of a raw material (trade name "Refined palm oil (S)", manufactured by The Nisshin Oillio Group, Ltd.) by melting-point fractionation [iodine value 75, amount of oleic acid 52, mass ratio of palmitic acid to oleic acid ((palmitic acid)/oleic acid))=0.65]

(Other Components)

- Silane coupling agent: trade name "Si69" (manufactured by Degussa)
- Paraffin oil: trade name "Process P200" (manufactured by JOMO)
- Stearic acid: trade name "LUNAC S-20" (manufactured by Kao Corporation)
- Zinc oxide: trade name "Zinc oxide grade 2" (manufactured by MITSUI MINING & SMELTING CO., LTD.)
- Wax: trade name "OZOACE0355" (manufactured by NIPPON SEIRO CO., LTD.)
- Antiaging agent 1: trade name "NOCRAC 6C" (manufactured by OUCHI SHINKO CHEMICAL INDUSTRIAL CO., LTD.)
- Antiaging agent 2: trade name "ANTAGE RD" (manufactured by Kawaguchi Chemical Industry Co., Ltd.)
- Hydrocarbon resin 1: trade name "Petrotack 90" (manufactured by Tosoh Corporation)
- Vulcanization accelerator 1: trade name "SOXINOL CZ" (manufactured by SUMITOMO CHEMICAL COMPANY, LIMITED)
- Vulcanization accelerator 2: trade name "NOCCELER D" (manufactured by OUCHI SHINKO CHEMICAL INDUSTRIAL CO., LTD.)
- Vulcanization accelerator 3: trade name "Sanceler NS-G" (manufactured by SANSHIN CHEMICAL INDUSTRY CO., LTD.)
- Sulfur: trade name "Powder Sulfur" (manufactured by Tsurumi Chemical Industry Co., ltd.)

Unvulcanized samples of the rubber compositions of Examples 1 to 12 and Comparative Examples 1 to 6 obtained above were prepared, and then tensile strength, scorch resistance, and abrasion resistance of vulcanized rubbers were evaluated under the following conditions.

(Tensile Strength of Vulcanized Rubber)

Each of the obtained unvulcanized samples was vulcanized under conditions of 160° C. and 30 minutes, and the tensile strength of the resultant was measured by a tensile test (Dumbbell shape No. 3) in accordance with JIS K6251. In the case of Examples 1 to 3 and Comparative Example 2, tensile strength was expressed as an index number determined by taking the value of Comparative Example 1 as 100, in the case of Examples 4 to 6 and Comparative Example 4, tensile strength was expressed as an index number determined by taking the value of Comparative Example 3 as 100, in the case of Examples 7 to 9, tensile strength was expressed as an index number determined by taking the value of Comparative Example 5 as 100, and in the case of Examples 10 to 12, tensile strength was expressed as an index number determined by taking the value of Comparative Example 6 as 100. The larger index number indicates that tensile strength is higher and reinforcement properties are more excellent.

(Scorch Resistance of Vulcanized Rubber)

A t5 value was measured by a Mooney scorch tester (L-type rotor) based on JIS K6300-1 under conditions of a preheating time of 1 minute and a temperature of 125° C. In the case of Examples 1 to 3 and Comparative Example 2, scorch resistance was expressed as an index number determined by taking the value of Comparative Example 1 as 100, in the case of Examples 4 to 6 and Comparative Example 4, scorch resistance was expressed as an index number determined by taking the value of Comparative Example 3 as 100, in the case of Examples 7 to 9, scorch resistance was expressed as an index number determined by taking the value of Comparative Example 5 as 100, and in the case of Examples 10 to 12, scorch resistance was expressed as an index number determined by taking the value of Comparative Example 6 as 100. The larger index number indicates that scorch is less likely to occur and scorch resistance is more excellent.

(Abrasion Resistance of Vulcanized Rubber)

Each of the obtained unvulcanized samples was vulcanized under conditions of 160° C. and 30 minutes, and abrasion loss of the resultant was measured in accordance with JIS K6264 using a Lambourn abrasion tester under conditions of a load of 3 kg, a slip ratio of 20%, and a temperature of 23° C. In the case of Examples 1 to 3 and Comparative Example 2, abrasion resistance was expressed as an index number determined by taking the reciprocal of the value of Comparative Example 1 as 100, in the case of Examples 4 to 6 and Comparative Example 4, abrasion resistance was expressed as an index number determined by taking the reciprocal of the value of Comparative Example 3 as 100, in the case of Examples 7 to 9, abrasion resistance was expressed as an index number determined by taking the reciprocal of the value of Comparative Example 5 as 100, and in the case of Examples 10 to 12, abrasion resistance was expressed as an index number determined by taking the reciprocal of the value of Comparative Example 6 as 100. The larger index number indicates that abrasion resistance is more excellent.

TABLE 1

| | Comparative Example 1 | Comparative Example 2 | Example 1 | Example 2 | Example 3 |
|---|---|---|---|---|---|
| (Formulation) | | | | | |
| SBR1 | 100 | 100 | 100 | 100 | 100 |
| CB1 | 70 | 70 | 70 | 70 | 70 |
| Paraffin oil | 37.5 | | | | |
| Vegetable oil 1 | | 37.5 | | | |
| Vegetable oil 2 | | | 37.5 | | |
| Vegetable oil 3 | | | | 37.5 | |
| Vegetable oil 4 | | | | | 37.5 |
| Stearic acid | 2 | 2 | 2 | 2 | 2 |
| Zinc oxide | 2 | 2 | 2 | 2 | 2 |
| Wax | 2 | 2 | 3 | 2 | 2 |
| Antiaging agent 1 | 1 | 1 | 1 | 1 | 1 |
| Vulcanization accelerator 1 | 1.5 | 1.5 | 1.5 | 1.5 | 1.5 |

TABLE 1-continued

| | Comparative Example 1 | Comparative Example 2 | Example 1 | Example 2 | Example 3 |
|---|---|---|---|---|---|
| Vulcanization accelerator 2 | 0.5 | 0.5 | 0.5 | 0.5 | 0.5 |
| Sulfur | 2 | 2 | 2 | 2 | 2 |
| (Evaluation) | | | | | |
| Tensile strength | 100 | 116 | 130 | 131 | 135 |

As can be seen from the results shown in Table 1, the vulcanized rubbers for tires respectively obtained using the rubber compositions for tires according to Examples 1 to 3 as a raw material have particularly high tensile strength and excellent reinforcement properties.

TABLE 2

| | Comparative Example 3 | Comparative Example 4 | Example 4 | Example 5 | Example 6 |
|---|---|---|---|---|---|
| (Formulation) | | | | | |
| BR1 | 60 | 60 | 60 | 60 | 60 |
| NR | 40 | 40 | 40 | 40 | 40 |
| CB2 | 50 | 50 | 50 | 50 | 50 |
| Paraffin oil | 16 | | | | |
| Vegetable oil 1 | | 16 | | | |
| Vegetable oil 2 | | | 16 | | |
| Vegetable oil 3 | | | | 16 | |
| Vegetable oil 4 | | | | | 16 |
| Stearic acid | 2 | 2 | 2 | 2 | 2 |
| zinc oxide | 2 | 2 | 2 | 2 | 2 |
| Wax | 2 | 2 | 2 | 2 | 2 |
| Antiaging agent 1 | 4 | 4 | 4 | 4 | 4 |
| Antiaging agent 2 | 2 | 2 | 2 | 2 | 2 |
| Vulcanization accelerator 1 | 1 | 1 | 1 | 1 | 1 |
| Sulfur | 2 | 2 | 2 | 2 | 2 |
| (Evaluation) | | | | | |
| Scorch resistance | 100 | 99 | 106 | 105 | 104 |
| Tensile strength | 100 | 109 | 112 | 115 | 113 |

As can be seen from the results shown in Table 2, the vulcanized rubbers for tires respectively obtained using the rubber compositions for tires according to Examples 4 to 6 as a raw material have particularly high tensile strength and excellent reinforcement properties. In addition, it can be seen that the vulcanized rubbers for tires respectively obtained using the rubber compositions for tires according to Examples 4 to 6 as a raw material also have excellent scorch resistance.

TABLE 3

| | Comparative Example 5 | Example 7 | Example 8 | Example 9 |
|---|---|---|---|---|
| (Formulation) | | | | |
| SBR1 | 55 | 55 | 5.5 | 55 |
| NR | 45 | 45 | 45 | 45 |
| CB3 | 60 | 60 | 60 | 60 |
| Paraffin oil | 8 | | | |
| Vegetable oil 2 | | 8 | | |
| Vegetable oil 3 | | | 8 | |
| Vegetable oil 4 | | | | 8 |
| Stearic acid | 2 | | 2 | |
| Zinc oxide | 2 | | 2 | 2 |

TABLE 3-continued

| | Comparative Example 5 | Example 7 | Example 8 | Example 9 |
|---|---|---|---|---|
| Wax | 2 | 2 | 2 | 2 |
| Antiaging agent 1 | 1 | 1 | 1 | 1 |
| Antiaging agent 2 | 0.5 | 0.5 | 0.5 | 0.5 |
| Hydrocarbon resin 1 | 2 | 2 | 2 | 2 |
| Vulcanization accelerator 2 | 1 | 1 | 1 | 1 |
| Vulcanization accelerator 3 | 1.5 | 1.5 | 1.5 | 1.5 |
| Sulfur | 2 | 2 | 2 | 2 |
| (Evaluation) | | | | |
| Scorch resistance | 100 | 103 | 103 | 103 |
| Tensile strength | 100 | 118 | 115 | 116 |
| Abrasion resistance | 100 | 115 | 114 | 113 |

As can be seen from the results shown in Table 3, the vulcanized rubbers for tires respectively obtained using the rubber compositions for tires according to Examples 7 to 9 as a raw material have particularly high tensile strength and excellent reinforcement properties. In addition, it can be seen that the vulcanized rubbers for tires respectively obtained using the rubber compositions for tires according to Examples 7 to 9 as a raw material also have excellent scorch resistance and abrasion resistance.

TABLE 4

| | Comparative Example 6 | Example 10 | Example 11 | Example 12 |
|---|---|---|---|---|
| (Formulation) | | | | |
| SBR1 | 40 | 40 | 40 | 40 |
| SBP2 | 60 | 60 | 60 | 60 |
| CB1 | 5 | 5 | 5 | 5 |
| Silica | 85 | 85 | 85 | 85 |
| Silane coupling agent | 7 | 7 | 7 | |
| Paraffin oil | 27 | | | |
| Vegetable oil 2 | | 27 | | |
| Vegetable oil 3 | | | 27 | |
| Vegetable oil 4 | | | | 27 |
| Stearic acid | | 2 | 2 | 2 |
| Zinc oxide | 2 | 2 | 2 | 2 |
| Wax | 2 | 2 | 2 | 2 |
| Antiaging agent 1 | 2 | 2 | 2 | 2 |
| Antiaging agent 2 | | 1 | 1 | 1 |

TABLE 4-continued

| | Comparative Example 6 | Example 10 | Example 11 | Example 12 |
|---|---|---|---|---|
| Vulcanization accelerator 1 | 2 | 2 | 2 | 2 |
| Vulcanization accelerator 2 | 2 | 2 | 2 | 2 |
| Sulfur | 2 | 2 | 2 | 2 |
| (Evaluation) | | | | |
| Scorch resistance | 100 | 98 | 99 | 98 |
| Tensile strength | 100 | 103 | 103 | 103 |
| Abrasion resistance | 100 | 106 | 105 | 107 |

As can be seen from the results shown in Table 4, the vulcanized rubbers for tires respectively obtained using the rubber compositions for tires according to Examples 10 to 12 as a raw material have particularly high tensile strength and excellent reinforcement properties. In addition, it can be seen that the vulcanized rubbers for tires respectively obtained using the rubber compositions for tires according to Examples 10 to 12 as a raw material also have excellent abrasion resistance. It should be noted that the vulcanized rubbers for tires respectively obtained using the rubber compositions for tires according to Examples 10 to 12 as a raw material were slightly inferior in scorch resistance, but there was no problem for practical use.

What is claimed is:

1. A rubber composition for tires, comprising a rubber component and a vegetable oil, wherein the vegetable oil contains palmitic acid and oleic acid in a mass ratio ((palmitic acid)/(oleic acid)) of 0.65 or more and 1.2 or less, wherein the vegetable oil is palm oil and has an iodine value of 53 or more and 75 or less.

2. The rubber composition for tires according to claim 1, wherein the vegetable oil has an oleic acid content of 40% by mass or more and 53% by mass or less.

3. A pneumatic tire comprising a rubber member obtained by vulcanization molding of the rubber composition for tires according to claim 1.

4. A pneumatic tire comprising a rubber member obtained by vulcanization molding of the rubber composition for tires according to claim 2.

5. The rubber composition for tires according to claim 1, wherein the palm oil has an oleic acid content of 48% by mass or more and 52% by mass or less.

* * * * *